United States Patent
Huh et al.

(10) Patent No.: US 11,852,846 B1
(45) Date of Patent: Dec. 26, 2023

(54) 3D DISPLAY DEVICE

(71) Applicant: Samsung Display Co., Ltd., Yongin-si (KR)

(72) Inventors: Sujung Huh, Yongin-si (KR); Hyun Jin Cho, Yongin-si (KR); Rangkyun Mok, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/101,437

(22) Filed: Jan. 25, 2023

(30) Foreign Application Priority Data

Jun. 3, 2022 (KR) .................. 10-2022-0068057

(51) Int. Cl.
  *G02F 1/1335* (2006.01)
  *G02B 30/28* (2020.01)
  *G02F 1/1343* (2006.01)

(52) U.S. Cl.
  CPC ....... *G02B 30/28* (2020.01); *G02F 1/133526* (2013.01); *G02F 1/133531* (2021.01); *G02F 1/134363* (2013.01)

(58) Field of Classification Search
  CPC ............ G02B 30/28; G02F 1/133526; G02F 1/133531
  See application file for complete search history.

(56) References Cited

U.S. PATENT DOCUMENTS

| 7,058,252 B2 | 6/2006 | Woodgate et al. |
| 2006/0202910 A1 | 9/2006 | Cha et al. |
| 2012/0320288 A1* | 12/2012 | Baek .......... G02B 30/27 349/200 |
| 2020/0073170 A1* | 3/2020 | Blum .......... G02F 1/29 |

FOREIGN PATENT DOCUMENTS

| JP | 6670423 B1 | 3/2020 |
| KR | 1020060096228 A | 9/2006 |
| KR | 102282172 B1 | 7/2021 |

* cited by examiner

*Primary Examiner* — James A Dudek
(74) *Attorney, Agent, or Firm* — CANTOR COLBURN LLP

(57) ABSTRACT

A three-dimensional (3D) display device includes a display panel which operates in a first mode for displaying a first image or a second mode for displaying a second image and a liquid crystal lens panel disposed on the display panel, where the liquid crystal lens panel refracts the first image in a way such that the first image has a first viewing angle and refracts the second image in a way such that the second image has a second viewing angle greater than the first viewing angle. The liquid crystal lens panel includes an upper substrate, a first lens layer including a plurality of first lenses, a lower substrate, a second lens layer including a plurality of second lenses, and a liquid crystal layer. A first pitch of each of the plurality of first lenses is less than a second pitch of each of the plurality of second lenses.

19 Claims, 5 Drawing Sheets

3D DISPLAY DEVICE

This application claims priority to Korean Patent Application No. 10-2022-0068057, filed on Jun. 03, 2022, and all the benefits accruing therefrom under 35 U.S.C. §119, the content of which in its entirety is herein incorporated by reference.

BACKGROUND

1. Field

Embodiments of the disclosure described herein relate to a three-dimensional (3D) display device for providing a three-dimensional image in a glasses-free manner.

2. Description of the Related Art

A 3D display device may implement a three-dimensional image using a stereoscopic technique or an autostereoscopic technique.

The stereoscopic technique is classified into a glasses type and a non-glassless type. A glasses-type stereoscopic display device provides a three-dimensional image to a user by changing polarization directions of a left eye image and a right eye image using a patterned retarder, or by displaying the left eye image and the right eye image at a predetermined time interval.

A non-glasses type stereoscopic display device includes a barrier panel or a liquid crystal lens panel to separate optical axes of a left eye image and a right eye image from each other. The display device including the barrier panel may be referred to as a parallax barrier type display device, and the display device including the liquid crystal lens panel may be referred to as a lenticular type display device. The display device including the liquid crystal lens panel may provide the left eye image and the right eye image to the left and right eyes of a user by controlling an operating mode of the liquid crystal lens panel.

SUMMARY

Embodiments of the disclosure provide a three-dimensional (3D) display device having improved display quality.

According to an embodiment, a 3D display device includes a display panel which operates in a first mode for displaying a first image or a second mode for displaying a second image different from the first image and a liquid crystal lens panel disposed on the display panel, where the liquid crystal lens panel refracts the first image in a way such that the first image has a first viewing angle and refracts the second image in a way such that the second image has a second viewing angle greater than the first viewing angle. In such an embodiment, the liquid crystal lens panel includes an upper substrate including a common lens electrode, a first lens layer disposed under the upper substrate, where the first lens layer includes a plurality of first lenses, a lower substrate disposed to face the upper substrate, where the lower substrate includes a lens electrode, a second lens layer disposed on the lower substrate, where the second lens layer includes a plurality of second lenses, and a liquid crystal layer disposed between the lower substrate and the upper substrate. In such an embodiment, a first pitch of each of the plurality of first lenses is less than a second pitch of each of the plurality of second lenses.

In an embodiment, a 3D image may be displayed in the first mode and the second mode.

In an embodiment, the 3D display device may further include a polarization layer disposed between the display panel and the liquid crystal lens panel.

In an embodiment, each of the plurality of first lenses may include a concave lens, and each of the plurality of second lenses may include a convex lens.

In an embodiment, a voltage may not be applied to the common lens electrode and the lens electrode in the first mode, and the first image may be refracted in the first lens layer in the first mode.

In an embodiment, a voltage may be applied to the common lens electrode and the lens electrode in the second mode, and the second image may be refracted in the second lens layer in the second mode.

In an embodiment, a height of each of the plurality of first lenses may be less than a height of each of the plurality of second lenses.

In an embodiment, a first focal length of each of the plurality of first lenses may be greater than a second focal length of each of the plurality of second lenses.

In an embodiment, the liquid crystal layer may have a first refractive index or a second refractive index different from the first refractive index, depending on whether a voltage to the common lens electrode and the lens electrode is applied or not. In such an embodiment, the first lens layer may have the first refractive index, and the second lens layer may have the second refractive index.

In an embodiment, when viewed in a plan view in a thickness direction of the display panel, a distance from a first edge of one of the plurality of first lenses to a second edge of a corresponding one of the plurality of second lenses may be less than ½ of the second pitch of each of the plurality of second lenses.

In an embodiment, the first viewing angle may be less than about 40°, and the second viewing angle may be greater than about 40°.

According to an embodiment, a 3D display device includes a display panel which displays a 3D image and a liquid crystal lens panel disposed on the display panel. In such an embodiment, the liquid crystal lens panel includes a first lens layer disposed over the display panel, where the first lens layer includes a plurality of first lenses, a second lens layer disposed between the display panel and the first lens layer, where the second lens layer includes a plurality of second lenses, and a liquid crystal layer disposed between the first lens layer and the second lens layer. In such an embodiment, a height of each of the plurality of first lenses is less than a height of each of the plurality of second lenses.

In an embodiment, the 3D display device may further include a polarization layer disposed between the display panel and the liquid crystal lens panel.

In an embodiment, each of the plurality of first lenses may include a concave lens, and each of the plurality of second lenses may include a convex lens.

In an embodiment, a first focal length of each of the plurality of first lenses may be greater than a second focal length of each of the plurality of second lenses.

In an embodiment, the liquid crystal layer may have a first refractive index when an electric field is applied to the liquid crystal layer, and the liquid crystal layer may have a second refractive index different from the first refractive index when no electric field is applied to the liquid crystal layer . In such an embodiment, the first lens layer may have the first refractive index, and the second lens layer may have the second refractive index.

In an embodiment, when the liquid crystal layer has the first refractive index, the 3D image may be refracted by the first lens layer in a way such that the 3D image has a first viewing angle less than about 40°.

In an embodiment, when the liquid crystal layer has the second refractive index, the 3D image may be refracted by the second lens layer in a way such that the three-dimensional image has a second viewing angle greater than about 40°.

In an embodiment, 1.5 times a first pitch of each of the plurality of first lenses may be less than a second pitch of each of the plurality of second lenses.

In an embodiment, When viewed in a plan view in a thickness direction of the display panel, a distance from a first edge of one of the plurality of first lenses to a second edge of a corresponding one of the plurality of second lenses may be greater than 0 and less than ½ of a second pitch of each of the plurality of second lenses.

BRIEF DESCRIPTION OF THE DRAWINGS

The above and other features of the disclosure will become apparent by describing in detail embodiments thereof with reference to the accompanying drawings, in which.

DETAILED DESCRIPTION

Figure 1:
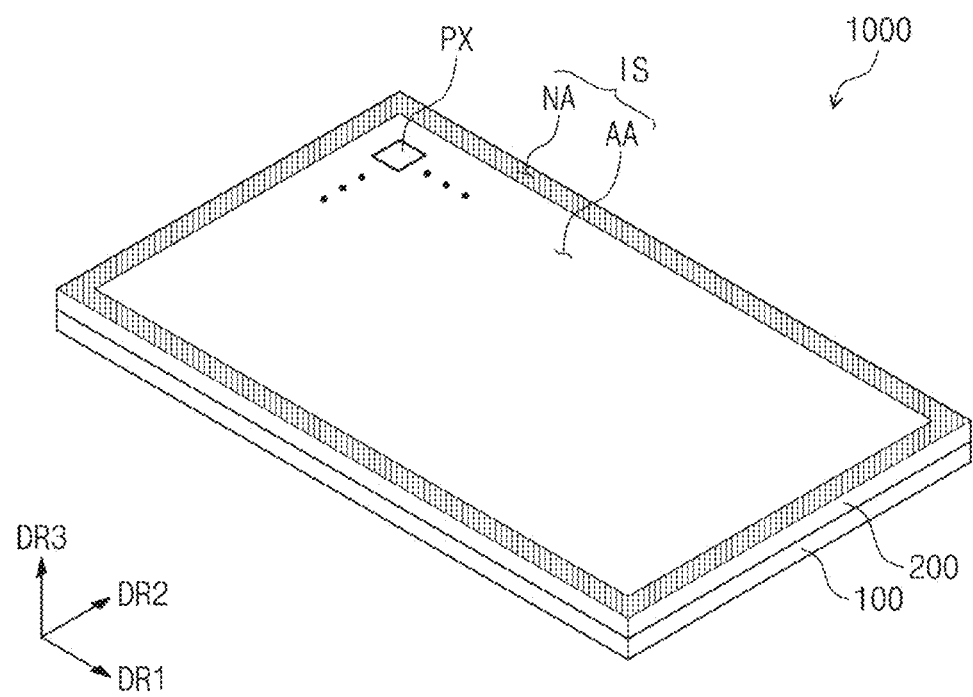
FIG. 1 is a perspective view of a three-dimensional (3D) display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this specification, when it is mentioned that a component (or, an area, a layer, a part, etc.) is referred to as being "on", "connected to" or "coupled to" another component, this means that the component may be directly on, connected to, or coupled to the other component or a third component may be therebetween.

Identical reference numerals refer to identical components. Additionally, in the drawings, the thicknesses, proportions, and dimensions of components are exaggerated for effective description.

Terms such as first, second, and the like may be used to describe various components, but the components should not be limited by the terms. The terms may be used only for distinguishing one component from other components. For example, without departing the scope of the disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof Unless otherwise defined, all terms used herein, including technical or scientific terms, have the same meanings as those generally understood by those skilled in the art to which the disclosure pertains. Such terms as those defined in a generally used dictionary are to be interpreted as having meanings equal to the contextual meanings in the relevant field of art, and are not to be interpreted as having ideal or excessively formal meanings unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the disclosure will be described in detail with reference to the accompanying drawings.

FIG. 1 is a perspective view of a three-dimensional (3D) display device according to an embodiment of the disclosure.

Referring to FIG. 1, an embodiment of the 3D display device 1000 may be a component that substantially generates an image. The 3D display device 1000 may be an emissive display device or a non-emissive display device. In an embodiment, for example, the 3D display device 1000 may be one of an organic light emitting display device, a quantum-dot light emitting display device, a micro light emitting diode (LED) display device, a nano LED display device, a liquid crystal display device, an electrophoretic display device, an electrowetting display device, and a micro-electro-mechanical systems (MEMS) display device and is not particularly limited.

The 3D display device 1000 may include a display panel 100 and a liquid crystal lens panel 200.

The display panel 100 may be used not only for a large display panel, such as a television, a monitor, or outdoor signage, but also for a small and medium-sized display panel, such as a personal computer, a notebook computer, a personal digital terminal, a car navigation unit, a game machine, a portable electronic device, or a camera. However, these are merely illustrative, and the display panel 100 may be employed for other display panels as long as it does not deviate from the concept of the disclosure.

The display panel 100 according to an embodiment of the disclosure may be an emissive display panel or a non-emissive display panel and is not particularly limited. In an embodiment, for example, the emissive display panel may be an organic light emitting display panel, a quantum-dot light emitting display panel, a micro LED display panel, or a nano LED display panel. An emissive layer of the organic light emitting display panel may contain an organic light emitting material. An emissive layer of the quantum-dot light emitting display panel may contain quantum dots or quantum rods. An emissive layer of the micro LED display panel may contain micro LEDs. An emissive layer of the nano LED display panel may contain nano LEDs. The non-emissive display panel may include a liquid crystal display panel.

The liquid crystal lens panel 200 may be disposed on the display panel 100, which will be described later in greater detail.

The 3D display device 1000 may display an image through a display surface IS. The display surface IS may be parallel to a plane defined by a first direction DR1 and a second direction DR2. The display surface IS may include an active area AA and a peripheral area NA. Pixels PX may be disposed in the active area AA and may not be disposed in the peripheral area NA. The peripheral area NA may be defined along the periphery of the display surface IS. The peripheral area NA may surround the active area AA. In an embodiment of the disclosure, the peripheral area NA be omitted, or may be disposed on only one side of the active area AA.

The normal direction of the display surface IS, that is, the thickness direction of the 3D display device 1000, may be indicated by a third direction DR3. Front surfaces (or, upper surfaces) and rear surfaces (or, lower surfaces) of layers or units to be described below are distinguished from each other based on the third direction DR3.

Although an embodiment of the 3D display device 1000 including the flat display surface IS is illustrated in FIG. 1, the disclosure is not limited thereto. Alternatively, the 3D display device 1000 may include a curved display surface or a 3D display surface. The 3D display surface may include a plurality of display areas indicating different directions.

Figure 2:
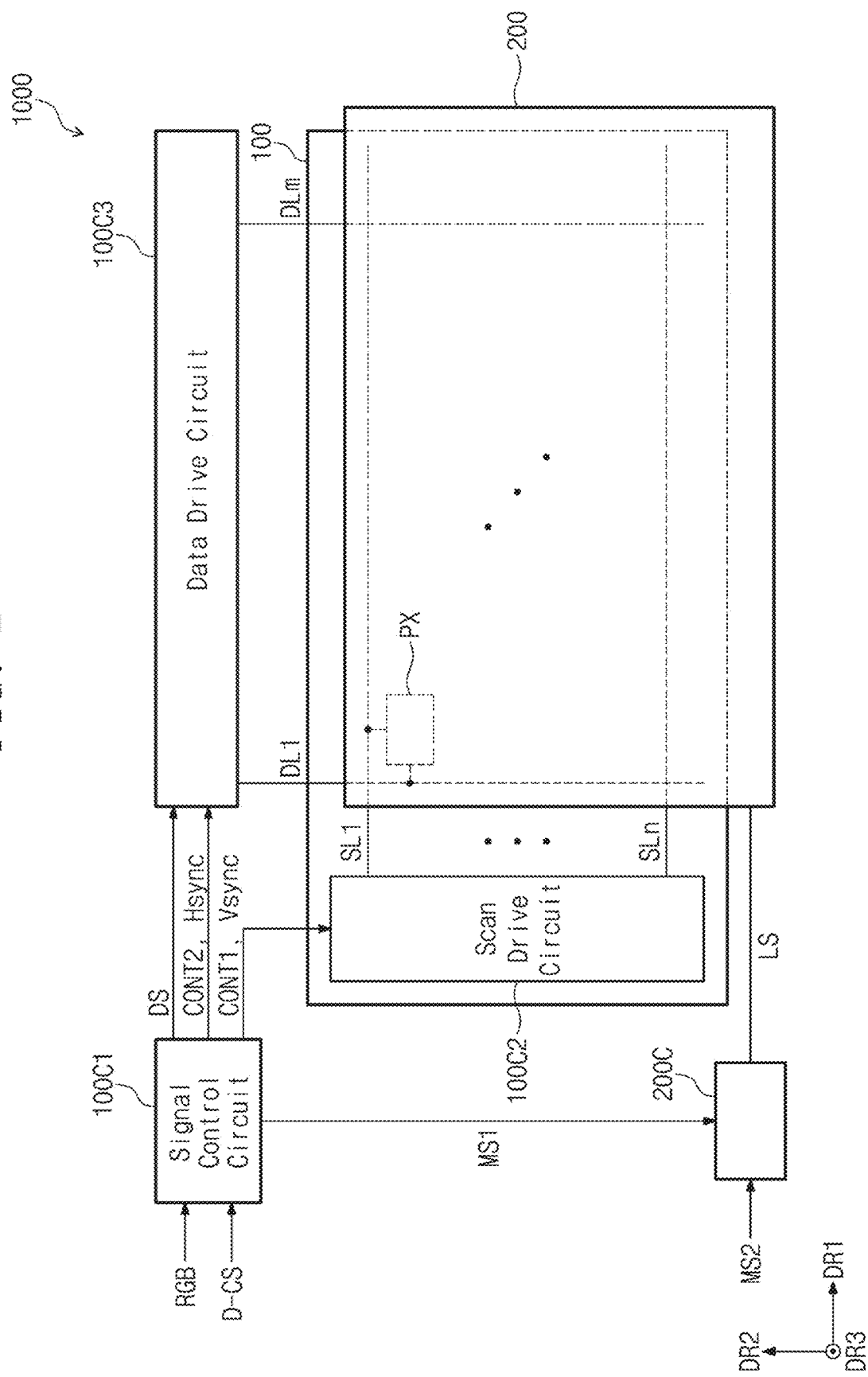
FIG. 2 is a block diagram of the 3D display device according to an embodiment of the disclosure.

FIG. 2 is a block diagram of the 3D display device according to an embodiment of the disclosure.

Referring to FIG. 2, an embodiment of the 3D display device 1000 may include the display panel 100, a signal control circuit 100C1, a scan drive circuit 100C2, a data drive circuit 100C3, the liquid crystal lens panel 200, and a liquid crystal driver 200C.

The display panel 100 may display an image based on input data RGB from an outside (or an external device). The image may include a first image that is a 3D image for one person and a second image that is a 3D image for multiple persons. The display panel 100 may operate in a first mode for displaying the first image or a second mode for displaying the second image. That is, the display panel 100 may display the 3D images in the first mode or in the second mode.

The display panel 100 may include a plurality of scan lines SL1 to SLn, a plurality of data lines DL1 to DLm, and a plurality of pixels PX. Each of the plurality of pixels PX may be connected with a corresponding data line among the plurality of data lines DL1 to DLm and may be connected with a corresponding scan line among the plurality of scan lines SL1 to SLn. In an embodiment of the disclosure, the display panel 100 may further include light emission control lines, and the 3D display device 1000 may further include a light emission drive circuit that provides control signals to the light emission control lines. A configuration of the display panel 100 is not particularly limited.

The signal control circuit 100C1 may receive the input data RGB and a control signal D-CS from an external device or controller. The external controller may include a graphic processing unit. The control signal D-CS may include various signals. In an embodiment, for example, the control signal D-CS may include an input vertical synchronization signal, an input horizontal synchronization signal, a main clock, and a data enable signal.

The signal control circuit 100C1 may generate a first control signal CONT1 and a vertical synchronization signal Vsync based on the control signal D-CS and may output the first control signal CONT1 and the vertical synchronization signal Vsync to the scan drive circuit 100C2. In an embodiment, the vertical synchronization signal Vsync may be included in the first control signal CONT1.

The signal control circuit 100C1 may generate a second control signal CONT2 and a horizontal synchronization signal Hsync based on the control signal D-CS and may output the second control signal CONT2 and the horizontal synchronization signal Hsync to the data drive circuit 100C3. In an embodiment, the horizontal synchronization signal Hsync may be included in the second control signal CONT2.

In an embodiment, the signal control circuit 100C1 may output, to the data drive circuit 100C3, a data signal DS obtained by processing the input data RGB according to an operating condition of the display panel 100. The first control signal CONT1 and the second control signal CONT2 are signals used for operations of the scan drive circuit 100C2 and the data drive circuit 100C3 and are not particularly limited.

The scan drive circuit 100C2 may drive the plurality of scan lines SL1 to SLn in response to the first control signal CONT1 and the vertical synchronization signal Vsync. In an embodiment of the disclosure, the scan drive circuit 100C2 may be formed through a same process as a circuit layer in the display panel 100, but is not limited thereto. In an alternative embodiment, for example, the scan drive circuit 100C2 may be implemented with an integrated circuit (IC) and may be directly mounted on a predetermined area of the display panel 100, or may be mounted on a separate printed circuit board in a chip on film (COF) manner and may be electrically connected with the display panel 100.

In response to the second control signal CONT2, the horizontal synchronization signal Hsync, and the data signal DS from the signal control circuit 100C1, the data drive circuit 100C3 may output gray voltages for driving the plurality of data lines DL1 to DLm. In an embodiment, the data drive circuit 100C3 may be implemented with an IC and may be directly mounted on a predetermined area of the display panel 100, or may be mounted on a separate printed circuit board in a chip on film manner and may be electrically connected with the display panel 100. However, the data drive circuit 100C3 is not particularly limited. In an alternative embodiment, for example, the data drive circuit 100C3 may be formed through a same process as the circuit layer in the display panel 100.

The liquid crystal lens panel 200 may be disposed on the display panel 100. When the first image is displayed on the display panel 100, the liquid crystal lens panel 200 may refract the first image in a way such that the first image has a first viewing angle. When the second image is displayed on the display panel 100, the liquid crystal lens panel 200 may refract the second image in a way such that the second image has a second viewing angle greater than the first viewing angle.

According to an embodiment of the disclosure, the display panel 100 may provide a 3D image to a user. The type of the 3D image may be determined based on the number of users who view the image. In an embodiment, for example, the 3D image may be a 3D image for one person or a 3D image for multiple persons. The liquid crystal lens panel 200 may refract the 3D image at an appropriate viewing angle depending on the type of the 3D image provided from the display panel 100. Accordingly, the 3D display device 1000 having improved display quality may be provided.

The signal control circuit 100C1 may determine the first image or the second image based on the input data RGB and may transmit a first control signal MS1 to the liquid crystal driver 200C.

Alternatively, the liquid crystal driver 200C may receive a second control signal MS2 from the outside. The second control signal MS2 may be a signal for controlling the liquid crystal lens panel 200 through which the user selects whether to view the first image or the second image.

The liquid crystal driver 200C may receive the first control signal MS1 and/or the second control signal MS2. The liquid crystal driver 200C may generate a liquid crystal control signal LS based on the first control signal MS1 and/or the second control signal MS2. The liquid crystal driver 200C may transmit the liquid crystal control signal LS to the liquid crystal lens panel 200.

According to an embodiment of the disclosure, the signal control circuit 100C1 may determine whether an image to be displayed through the display panel 100 is a 3D image for one person or an image for multiple persons, based on the input data RGB. The liquid crystal driver 200C may receive the first control signal MS1 and may determine the type of the image displayed on the display panel 100. In such an embodiment, the liquid crystal driver 200C may receive the second control signal MS2 for determining whether to display a 3D image for one person or a 3D image for multiple persons, depending on a display method of an image desired by the user. The liquid crystal driver 200C may transmit the liquid crystal control signal LS for operating the liquid crystal lens panel 200 in the first mode or the second mode, based on the first control signal MS1 and/or the second control signal MS2. The 3D display device 1000 may provide a 3D image to the user through an appropriate method depending on the type of image or the user's instruction. Accordingly, the 3D display device 1000 having improved reliability may be provided.

The liquid crystal lens panel 200 may determine whether to apply a voltage to a liquid crystal layer 250 (refer to FIG. 3), based on the liquid crystal control signal LS. In an embodiment, for example, when the display panel 100 operates in the first mode, the liquid crystal lens panel 200 may be turned off. When the display panel 100 operates in the second mode, the liquid crystal lens panel 200 may be turned on. Operations of the 3D display device 1000 in the first mode and the second mode will be described later in greater detail.

Figure 3:
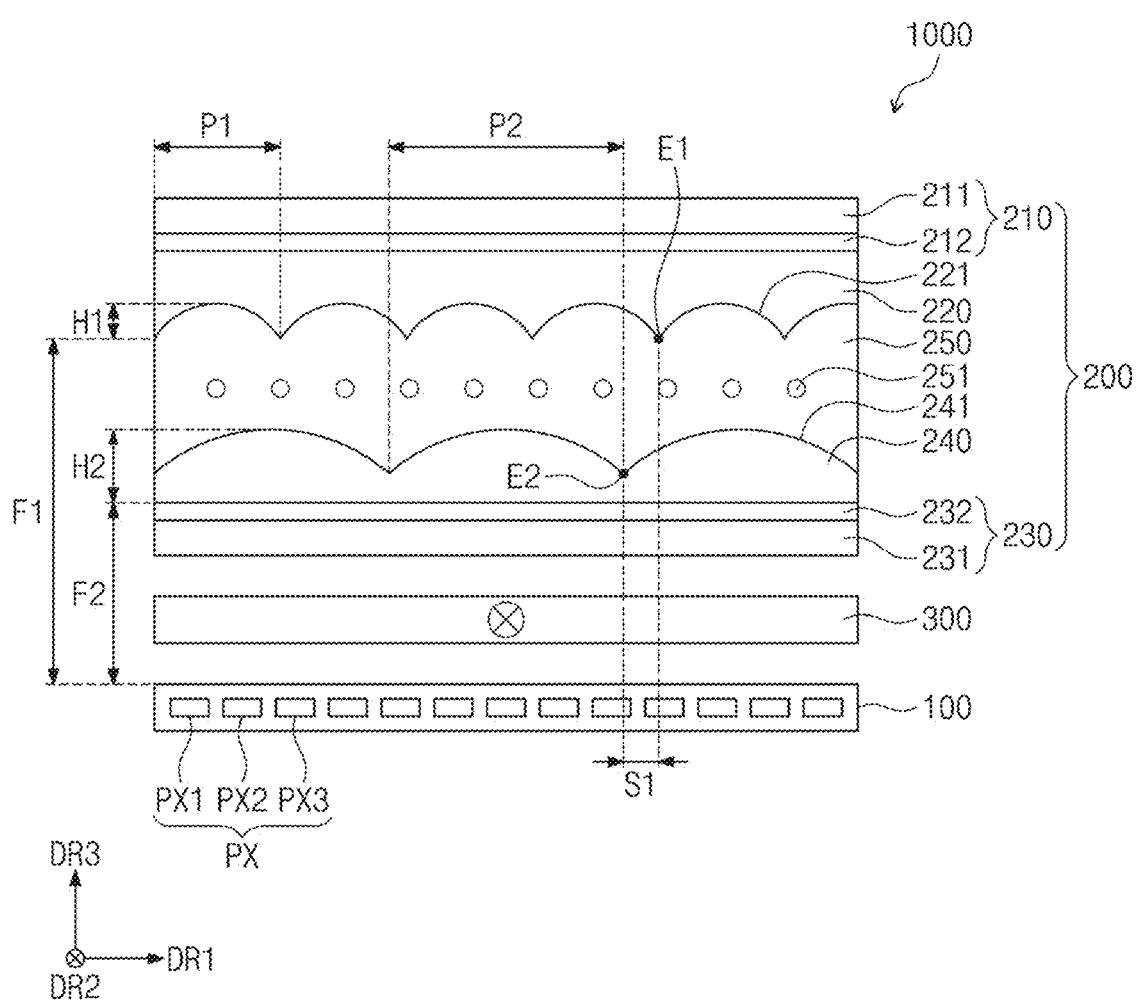
FIG. 3 is a sectional view of the 3D display device according to an embodiment of the disclosure.

FIG. 3 is a sectional view of the 3D display device according to an embodiment of the disclosure.

Referring to FIG. 3, the 3D display device 1000 may include the display panel 100, a polarization layer 300, and the liquid crystal lens panel 200.

The display panel 100 may include a plurality of pixels PX. The plurality of pixels PX may include a first pixel PX1, a second pixel PX2, and a third pixel PX3. The first pixel PX1 may provide first color light. The first color light may be red light. The second pixel PX2 may provide second color light. The second color light may be green light. The third pixel PX3 may provide third color light. The third color light may be blue light. However, this is illustrative, and the first color light, the second color light, and the third color light according to an embodiment of the disclosure are not limited thereto. The first, second, and third pixels PX1, PX2, and PX3 may be repeatedly arranged in sequence in the first direction DR1.

The polarization layer 300 may be disposed over the display panel 100. The polarization layer 300 may polarize light provided from the display panel 100. The polarization layer 300 may polarize the light provided from the display panel 100 in a polarization direction parallel to the second direction DR2. However, this is illustrative, and the polarization direction of the polarization layer 300 according to an embodiment of the disclosure is not limited thereto. In an embodiment where polarized light is provided from the display panel 100, the polarization layer 300 may be omitted.

By the light polarized by the polarization layer 300, the liquid crystal lens panel 200 may adjust a viewing angle depending on the type of 3D image.

The liquid crystal lens panel 200 may be disposed over the polarization layer 300. The liquid crystal lens panel 200 may include an upper substrate 210, a first lens layer 220, a lower substrate 230, a second lens layer 240, and the liquid crystal layer 250.

The upper substrate 210 may be disposed over the polarization layer 300. The upper substrate 210 may include a first substrate 211 and a common lens electrode 212.

The first substrate 211 may include a transparent glass substrate or a transparent polymer substrate. However, this is illustrative, and the first substrate 211 according to an embodiment of the disclosure is not limited thereto. In an embodiment, for example, the first substrate 211 may include an inorganic layer, an organic layer, or a composite layer.

The common lens electrode 212 may be disposed under the first substrate 211. The common lens electrode 212 may include a transparent electrode. In an embodiment, for example, the common lens electrode 212 may contain indium tin oxide (ITO). The common lens electrode 212 may be integrally provided on the entire lower surface of the first substrate 211 when viewed on the plane or in a plan view in the third direction DR3.

The first lens layer 220 may be disposed under the upper substrate 210. The first lens layer 220 may have a first refractive index. The first refractive index may be in a range from about 1.4 to about 1.5. In an embodiment, for example, the first refractive index may be about 1.496. However, this is illustrative, and the first refractive index according to an embodiment of the disclosure is not limited thereto.

The first lens layer 220 may include a plurality of first lenses 221.

The plurality of first lenses 221 may overlap the plurality of pixels PX when viewed on the plane. Each of the plurality of first lenses 221 may include (or be defined by a portion of the first lens layer 220 corresponding to) a concave lens having a cylindrical structure.

Each of the plurality of first lenses 221 may have a first pitch P1 in the first direction DR1.

Each of the plurality of first lenses 221 may have a first height H1 in the third direction DR3.

Each of the plurality of first lenses 221 may have a first focal length F1.

The lower substrate 230 may be disposed between the first lens layer 220 and the polarization layer 300. The lower substrate 230 may face the upper substrate 210. The lower substrate 230 may include a second substrate 231 and a lens electrode 232.

The second substrate 231 may be disposed between the polarization layer 300 and the lens electrode 232. The second substrate 231 may include a transparent glass substrate or a transparent polymer substrate. However, this is illustrative, and the second substrate 231 according to an embodiment of the disclosure is not limited thereto. In an embodiment, for example, the second substrate 231 may include an inorganic layer, an organic layer, or a composite layer.

The lens electrode 232 may be disposed on the second substrate 231. The lens electrode 232 may include a transparent electrode. In an embodiment, for example, the lens electrode 232 may contain ITO. The lens electrode 232 may be integrally provided on the entire upper surface of the second substrate 231 when viewed on the plane.

The second lens layer 240 may be disposed on the lower substrate 230. The second lens layer 240 may have a second refractive index different from the first refractive index of the first lens layer 220. The second refractive index may be in a range from about 1.51 to about 1.58. In an embodiment, for example, the second refractive index may be about 1.51. However, this is illustrative, and the second refractive index according to an embodiment of the disclosure is not limited thereto. The second refractive index of the second lens layer 240 may be greater than the first refractive index of the first lens layer 220. The second lens layer 240 may face the first lens layer 220.

The second lens layer 240 may include a plurality of second lenses 241.

The plurality of second lenses 241 may overlap the plurality of pixels PX when viewed on the plane. Each of the plurality of second lenses 241 may include (or be defined by a portion of the second lens layer 240 corresponding to) a convex lens having a cylindrical structure.

Each of the plurality of second lenses 241 may have a second pitch P2 in the first direction DR1. The second pitch P2 may be greater than the first pitch P1. In an embodiment, for example, the second pitch P2 may be 1.5 times greater than the first pitch P1.

If the second pitch P2 is not 1.5 times greater than the first pitch P1, the first lens layer 220 for refracting a 3D image for one person or the second lens layer 240 for refracting a 3D image for multiple persons may fail to refract a 3D image provided from the display panel 100 at an appropriate viewing angle depending on the number of users who view the 3D image. according to an embodiment of the disclosure, as described above, the first lens layer 220 and the second lens layer 240 may satisfy the condition in which the second pitch P2 is 1.5 times greater than the first pitch P1, such that the liquid crystal lens panel 200 may refract the 3D image at an appropriate viewing angle depending on the type of the 3D image provided from the display panel 100. Accordingly, the 3D display device 1000 having improved display quality may be provided.

Each of the plurality of second lenses 241 may have a second height H2 in the third direction DR3. The second height H2 may be greater than the first height H1. In an embodiment, for example, the second height H2 may be 1.15 times greater than the first height H1.

Each of the plurality of second lenses 241 may have a second focal length F2.

The liquid crystal layer 250 may be disposed between the first lens layer 220 and the second lens layer 240. The arrangement of liquid crystals 251 in the liquid crystal layer 250 may be determined based on a voltage applied to the common lens electrode 212 and the lens electrode 232. The liquid crystal layer 250 may have the first refractive index or the second refractive index, depending on whether the voltage is applied or not. The effective refractive index of the liquid crystal layer 250 may be determined based on the arrangement of the liquid crystals 251.

When viewed on the plane or in a plan view in the third direction DR3, the distance S1 between a first edge E1 of one of the plurality of first lenses 221 and a second edge E2 of a corresponding one of the plurality of second lenses 241 may be less than ½ of the second pitch P2 of each of the plurality of second lenses. That is, when viewed on the plane, the first edge E1 and the second edge E2 may not overlap each other.

According to an embodiment of the disclosure, the distance S1 may be designed to have a value greater than 0 and less than ½ of the second pitch P2 when the first lens layer 220 and the second lens layer 240 are aligned in a process of manufacturing the liquid crystal lens panel 200. As the distance S1 satisfies the above-mentioned value, the first lens layer 220 and the second lens layer 240 of the liquid crystal lens panel 200 may be easily aligned. In such an embodiment, the first lens layer 220 may refract a 3D image for one person at the first refractive index and may provide an image to the user at a viewing angle appropriate for the 3D image for one person, and the second lens layer 240 may refract a 3D image for multiple persons at the second refractive index and may provide an image to the user at a viewing angle appropriate for the 3D image for multiple persons. Accordingly, the 3D display device 1000 having improved display quality may be provided.

Figure 4:
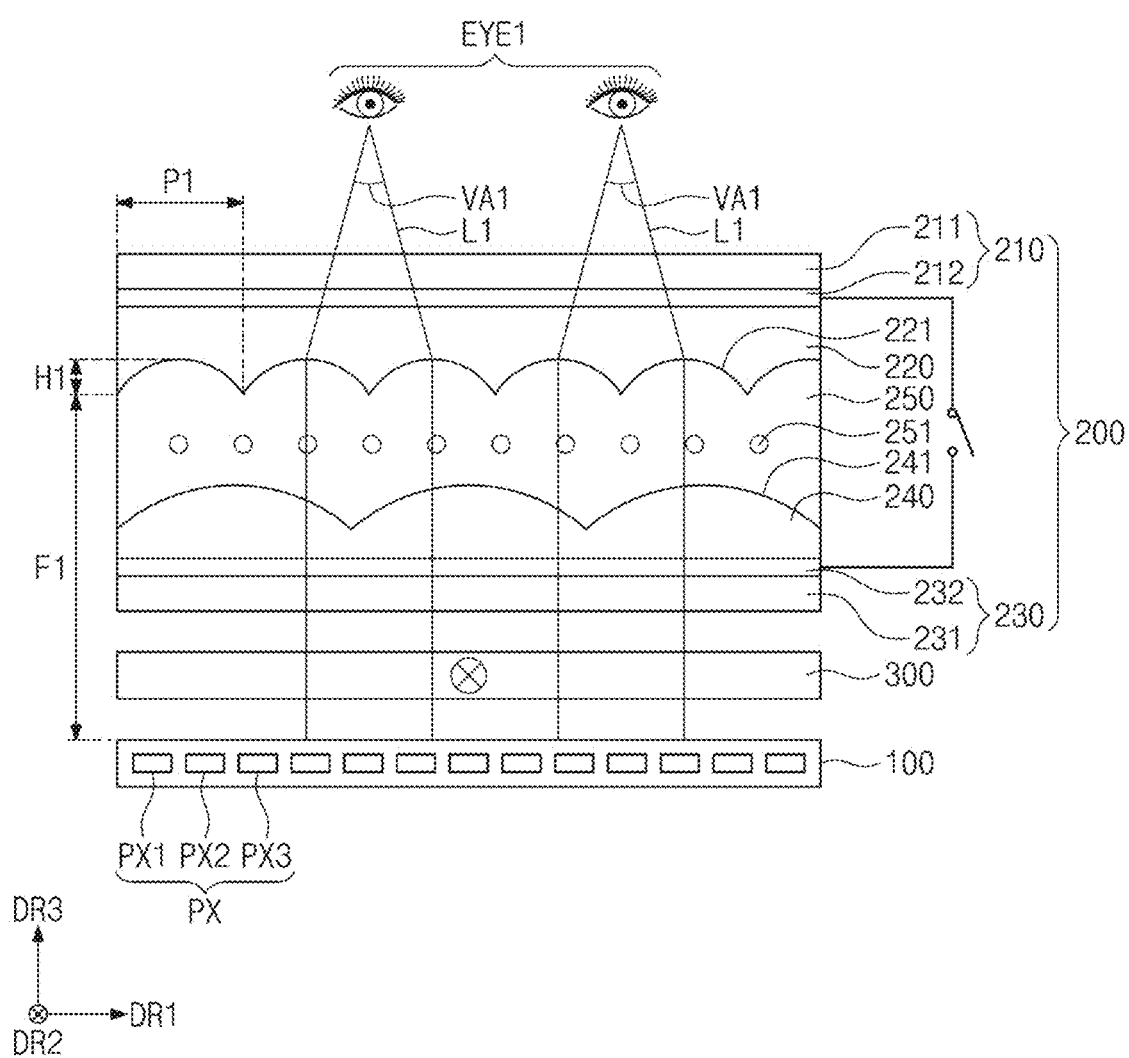
FIG. 4 is a sectional view of the 3D display device operating in a first mode according to an embodiment of the disclosure.

FIG. 4 is a sectional view of the 3D display device operating in the first mode according to an embodiment of the disclosure. The same or like elements in FIG. 4 as those described above with reference to FIG. 3 will be assigned with the same or like reference numerals, and any repetitive detailed descriptions thereof will be omitted or simplified.

Referring to FIG. 4, in an embodiment, the display panel 100 may display the first image that is a 3D image for one person.

The effective refractive index of the liquid crystal layer 250 may be controlled by an electric field generated therein by applying a voltage to the common lens electrode 212 and the lens electrode 232. The liquid crystal layer 250 may have the first refractive index or the second refractive index, depending on whether the voltage is applied or not, that is, whether an electric field is applied to the liquid crystal layer 250.

When the voltage is not applied in the first mode, the effective refractive index of the liquid crystal layer 250 may have the second refractive index substantially the same as that of the second lens layer 240. The effective refractive index of the liquid crystal layer 250 may differ from that of the first lens layer 220. When the voltage is not applied to the liquid crystal layer 250, the liquid crystal lens panel 200 may be referred to as being in an OFF state.

First light L1 forming the first image provided from the display panel 100 may be refracted at the interface between the liquid crystal layer 250 and the first lens layer 220 due to a difference in refractive index.

Due to the liquid crystal layer 250 having the second refractive index, the second lens layer 240 and the liquid crystal layer 250 may act as a convex lens, and the first light L1 may be refracted in the first lens layer 220 to provide different images to the eyes EYE1 of a user. Accordingly, a 3D image may be provided to the user.

Each of the plurality of first lenses 221 may have the first pitch P1. The first pitch P1 may be in a range from about 0.12 millimeter (mm) to about 0.25 mm. In an embodiment, for example, the first pitch P1 may be about 0.12092 mm. The first pitch P1 may be less than the second pitch P2 (refer to FIG. 3) of each of the plurality of second lenses 241.

Each of the plurality of first lenses 221 may have the first height H1. The first height H1 may be in a range from about 0.002 mm to about 0.006 mm. In an embodiment, for example, the first height H1 may be about 0.003 mm. The first height H1 may be less than the second height H2 (refer to FIG. 3) of each of the plurality of second lenses 241. The first height H1 may be less than the thickness of the polarization layer 300. In an embodiment, for example, the polarization layer 300 may have a thickness of about 0.084 mm.

Each of the plurality of first lenses 221 may have the first focal length F1. The first focal length F1 may be in a range from about 1.2 mm to about 1.9 mm. In an embodiment, for example, the first focal length F1 may be about 1.8 mm. The first focal length F1 may be greater than the second focal length F2 (refer to FIG. 3) of each of the plurality of second lenses 241. In an embodiment, for example, the difference between the first focal length F1 and the second focal length F2 (refer to FIG. 3) may correspond to the thickness of the liquid crystal layer 250.

The first radius of curvature of each of the plurality of first lenses 221 may be in a range from about 0.35 mm to about 0.65 mm. In an embodiment, for example, the first radius of curvature may be about 0.6109 mm. The first radius of curvature of each of the plurality of first lenses 221 may be greater than the second radius of curvature of each of the plurality of second lenses 241.

Each of the plurality of first lenses 221 may overlap a plurality of pixels PX when viewed on the plane. In an embodiment, the number of overlapping pixels PX may be referred to as a view number. Although FIG. 4 illustrates an embodiment where each of the plurality of first lenses 221 overlaps 2.5 pixels PX, the view number of each of the plurality of first lenses 221 according to an embodiment of the disclosure is not limited thereto. In an alternative embodiment, for example, each of the plurality of first lenses 221 may overlap 16 pixels PX when viewed on the plane. The view number of each of the plurality of first lenses 221 may be less than the view number of each of the plurality of second lenses 241.

In such an embodiment described above, the first lens layer 220 may refract the first image provided from the display panel 100 at an appropriate first viewing angle VA1. The first viewing angle VA1 may be greater than about 0° and less than about 40°. In an embodiment, for example, the first viewing angle VA1 may be about 2.81°. However, this is illustrative, and the first viewing angle VA1 according to an embodiment of the disclosure is not limited thereto. In an alternative embodiment, for example, the first viewing angle VA1 may be about 16°.

According to an embodiment of the disclosure, when the display panel 100 provides the first image that is an image for one person, the liquid crystal lens panel 200 may control the first image to have the first viewing angle VA1. In such an embodiment, the 3D display device 1000 may privately display the first image to only one user who is in front of the 3D display device 1000 in the first mode. Accordingly, the 3D display device 1000 capable of displaying an image suitable for a situation depending on the number of users may be provided. The 3D display device 1000 having improved display quality may be provided.

Figure 5:
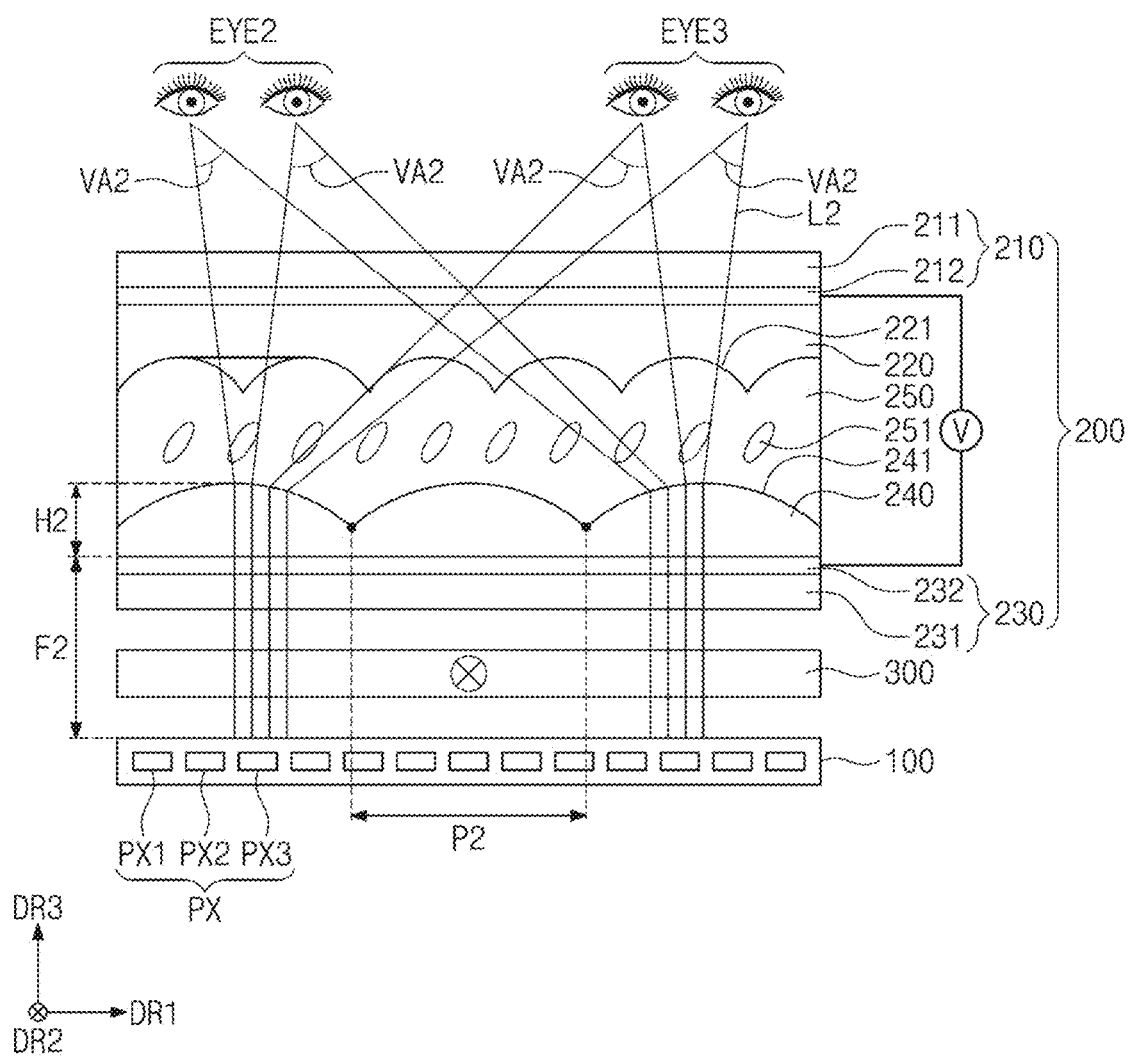
FIG. 5 is a sectional view of the 3D display device operating in a second mode according to an embodiment of the disclosure.

FIG. 5 is a sectional view of the 3D display device operating in the second mode according to an embodiment of the disclosure. The same or like elements shown in FIG. 5 as those described above with reference to FIGS. 3 and 4 will be assigned with the same or like reference numerals, and any repetitive detailed descriptions thereof will be omitted or simplified.

Referring to FIG. 5, in an embodiment, the display panel 100 may display the second image that is a 3D image for multiple persons.

A voltage V may be applied to the liquid crystal lens panel 200 in the second mode. The voltage V may be applied to the common lens electrode 212 integrally provided on the lower surface of the first substrate 211 and the lens electrode 232 integrally provided on the upper surface of the second substrate 231. The arrangement of the liquid crystals 251 in the liquid crystal layer 250 may be changed by the common lens electrode 212 and the lens electrode 232.

According to an embodiment of the disclosure, when the voltage V is applied to the common lens electrode 212 integrally provided on the lower surface of the first substrate 211 and the lens electrode 232 integrally provided on the upper surface of the second substrate 231, the effective refractive index of the entire liquid crystal layer 250 may be changed, and thus the first lens layer 220 and the liquid crystal layer 250 may have substantially the same refractive index as each other. The liquid crystal lens panel 200 may easily transition to the first mode and the second mode. Accordingly, the 3D display device 1000 having improved reliability may be provided.

When the voltage V is applied, the effective refractive index of the liquid crystal layer 250 may have the first refractive index substantially the same as that of the first lens layer 220. The effective refractive index of the liquid crystal layer 250 may differ from that of the second lens layer 240. When the voltage V is applied to the liquid crystal layer 250, the liquid crystal lens panel 200 may be referred to as being in an ON state.

Second light L2 forming the second image provided from the display panel 100 may be refracted at the interface between the second lens layer 240 and the liquid crystal layer 250 due to a difference in refractive index.

Due to the liquid crystal layer 250 having the effective refractive index different from that of the second lens layer 240, the second lens layer 240 may act as a convex lens, and the second light L2 may be refracted in the second lens layer 240 to provide different images to the eyes EYE2 and EYE3 of users. Accordingly, a 3D image may be provided to the users.

Each of the plurality of second lenses 241 may have the second pitch P2. The second pitch P2 may be in a range from about 0.18 mm to about 0.36 mm. In an embodiment, for example, the second pitch P2 may be about 0.35585 mm. The second pitch P2 may be greater than the first pitch P1 (refer to FIG. 3) of each of the plurality of first lenses 221.

Each of the plurality of second lenses 241 may have the second height H2. The second height H2 may be in a range from about 0.08 mm to about 0.09 mm. In an embodiment, for example, the second height H2 may be about 0.0874 mm. The second height H2 may be greater than the first height H1 (refer to FIG. 3) of each of the plurality of first lenses 221. The second height H2 may be greater than the thickness of the polarization layer 300. In an embodiment, for example, the polarization layer 300 may have a thickness of about 0.084 mm.

Each of the plurality of second lenses 241 may have the second focal length F2. The second focal length F2 may be in a range from about 0.43 mm to about 0.5 mm. In an embodiment, for example, the second focal length F2 may be about 0.4497 mm. The second focal length F2 may be less than the first focal length F1 (refer to FIG. 3) of each of the plurality of first lenses 221.

The second radius of curvature of each of the plurality of second lenses 241 may be in a range from about 0.20 mm to about 0.25 mm. In an embodiment, for example, the second radius of curvature may be about 0.2248 mm. The second radius of curvature of each of the plurality of second lenses 241 may be less than the first radius of curvature of each of the plurality of first lenses 221.

Each of the plurality of second lenses 241 may overlap a plurality of pixels PX when viewed on the plane. In an embodiment, the number of overlapping pixels PX may be referred to as a view number. Although FIG. 5 illustrates an embodiment where each of the plurality of second lenses 241 overlaps four pixels PX, the view number of each of the plurality of second lenses 241 according to an embodiment of the disclosure is not limited thereto. In an alternative embodiment, for example, each of the plurality of second lenses 241 may overlap 47 pixels PX. The view number of each of the plurality of second lenses 241 may be greater than the view number of each of the plurality of first lenses 221.

In such an embodiment described above, the second lens layer 240 may refract the second image provided from the display panel 100 at an appropriate second viewing angle VA2. The second viewing angle VA2 may be greater than about 40° and less than about 180°. In an embodiment, for example, the second viewing angle VA2 may be about 45°.

According to an embodiment of the disclosure, when the display panel 100 provides the second image that is an image for multiple persons, the liquid crystal lens panel 200 may control the second image to have the second viewing angle VA2 greater than the first viewing angle VA1 (refer to FIG. 4). In such an embodiment, the 3D display device 1000 may display the second images to a plurality of users. The liquid crystal lens panel 200 may provide an environment in which a large number of people can easily view the second image. Although FIG. 5 illustrates two users for convenience of illustration, the number of users according to an embodiment of the disclosure is not limited thereto, and two or more users may view the second image. Accordingly, the 3D display device 1000 capable of displaying an image suitable for a situation depending on the number of users may be provided. The 3D display device 1000 having improved display quality may be provided.

As described above, in embodiments of the invention, the display panel may provide a 3D image to a user. The type of the 3D image may be determined based on the number of users who view the image. In an embodiment, for example, the 3D image may be a 3D image for one person or a 3D image for multiple persons. The liquid crystal lens panel may refract the 3D image at an appropriate viewing angle depending on the type of the 3D image provided from the display panel. Accordingly, the 3D display device having improved display quality may be provided.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A three-dimensional display device comprising:
a display panel which operates in a first mode for displaying a first image that is an image for one person or a second mode for displaying a second image that is an image for multiple persons and different from the first image; and
a liquid crystal lens panel disposed on the display panel, wherein the liquid crystal lens panel refracts the first image in a way such that the first image has a first viewing angle and refracts the second image in a way such that the second image has a second viewing angle greater than the first viewing angle,
wherein the liquid crystal lens panel includes:
an upper substrate including a common lens electrode;
a first lens layer disposed under the upper substrate, wherein the first lens layer includes a plurality of first lenses;
a lower substrate disposed to face the upper substrate, wherein the lower substrate includes a lens electrode;
a second lens layer disposed on the lower substrate, wherein the second lens layer includes a plurality of second lenses; and
a liquid crystal layer disposed between the lower substrate and the upper substrate,
wherein a first pitch of each of the plurality of first lenses is less than a second pitch of each of the plurality of second lenses,
wherein a voltage is not applied to the common lens electrode and the lens electrode in the first mode, and the first image is refracted in the first lens layer in the first mode and displayed at the first viewing angle, and
wherein a voltage is applied to the common lens electrode and the lens electrode in the second mode, and the second image is refracted in the second lens layer in the second mode and displayed at the second viewing angle.

2. The three-dimensional display device of claim 1, wherein a three-dimensional image is displayed in the first mode and the second mode.

3. The three-dimensional display device of claim 1, further comprising:
a polarization layer disposed between the display panel and the liquid crystal lens panel.

4. The three-dimensional display device of claim 1, wherein each of the plurality of first lenses includes a concave lens, and
wherein each of the plurality of second lenses includes a convex lens.

5. The three-dimensional display device of claim 1, wherein the first viewing angle is greater than about 0° and less than about 40°.

6. The three-dimensional display device of claim 5, wherein the second viewing angle is greater than about 40° and less than about 180°.

7. The three-dimensional display device of claim 1, wherein a height of each of the plurality of first lenses is less than a height of each of the plurality of second lenses.

8. The three-dimensional display device of claim 1, wherein a first focal length of each of the plurality of first lenses is greater than a second focal length of each of the plurality of second lenses.

9. The three-dimensional display device of claim 1, wherein the liquid crystal layer has a first refractive index or a second refractive index different from the first refractive index, depending on whether a voltage is applied to the common lens electrode and the lens electrode or not, and
wherein the first lens layer has the first refractive index, and the second lens layer has the second refractive index.

10. The three-dimensional display device of claim 1, wherein when viewed on a plane, a distance from a first edge of one of the plurality of first lenses to a second edge of a corresponding one of the plurality of second lenses is less than ½ of the second pitch of each of the plurality of second lenses.

11. A three-dimensional display device comprising:
a display panel which displays a three-dimensional image; and
a liquid crystal lens panel disposed on the display panel, wherein the liquid crystal lens panel includes:
a first lens layer disposed over the display panel, wherein the first lens layer includes a plurality of first lenses;
a second lens layer disposed between the display panel and the first lens layer, wherein the second lens layer includes a plurality of second lenses; and
a liquid crystal layer disposed between the first lens layer and the second lens layer,
wherein a height of each of the plurality of first lenses is less than a height of each of the plurality of second lenses,
wherein the three-dimensional image includes a first image that is an image for one person and a second image that is an image for multiple persons and different from the first image,
wherein a voltage is not applied to the liquid crystal layer, and the first image is refracted in the first lens layer and displayed at a first viewing angle, and
wherein a voltage is applied to the liquid crystal layer, and the second image is refracted in the second lens layer and displayed at a second viewing angle greater than the first viewing angle.

12. The three-dimensional display device of claim 11, further comprising:
a polarization layer disposed between the display panel and the liquid crystal lens panel.

13. The three-dimensional display device of claim 11, wherein each of the plurality of first lenses includes a concave lens, and
wherein each of the plurality of second lenses includes a convex lens.

14. The three-dimensional display device of claim 11, wherein a first focal length of each of the plurality of first lenses is greater than a second focal length of each of the plurality of second lenses.

15. The three-dimensional display device of claim 11,
wherein the liquid crystal layer has a first refractive index when an electric field is applied to the liquid crystal layer,
wherein the liquid crystal layer has a second refractive index different from the first refractive index when no electric field is applied to the liquid crystal layer, and
wherein the first lens layer has the first refractive index, and the second lens layer has the second refractive index.

16. The three-dimensional display device of claim 11, wherein the first viewing angle is greater than about 0° and less than about 40°.

17. The three-dimensional display device of claim 11, wherein the second viewing angle is greater than about 40° and less than about 180°.

18. The three-dimensional display device of claim 15, wherein 1.5 times a first pitch of each of the plurality of first lenses is less than a second pitch of each of the plurality of second lenses.

19. The three-dimensional display device of claim 15, wherein when viewed in a plan view in a thickness direction of the display panel, a distance from a first edge of one of the plurality of first lenses to a second edge of a corresponding one of the plurality of second lenses is greater than 0 and less than ½ of a second pitch of each of the plurality of second lenses.

* * * * *